June 6, 1939. T. H. SCHOEPF ET AL 2,161,686
AIR CONDITIONING APPARATUS FOR RAILWAY VEHICLES
Original Filed Sept. 9, 1936  7 Sheets-Sheet 1

Inventors
THEODORE H. SCHOEPF,
DAVID M. RITCHIE,
Attorneys

June 6, 1939.  T. H. SCHOEPF ET AL  2,161,686
AIR CONDITIONING APPARATUS FOR RAILWAY VEHICLES
Original Filed Sept. 9, 1936   7 Sheets-Sheet 5

THEODORE H. SCHOEPF,
DAVID M. RITCHIE, Inventors

Attorneys

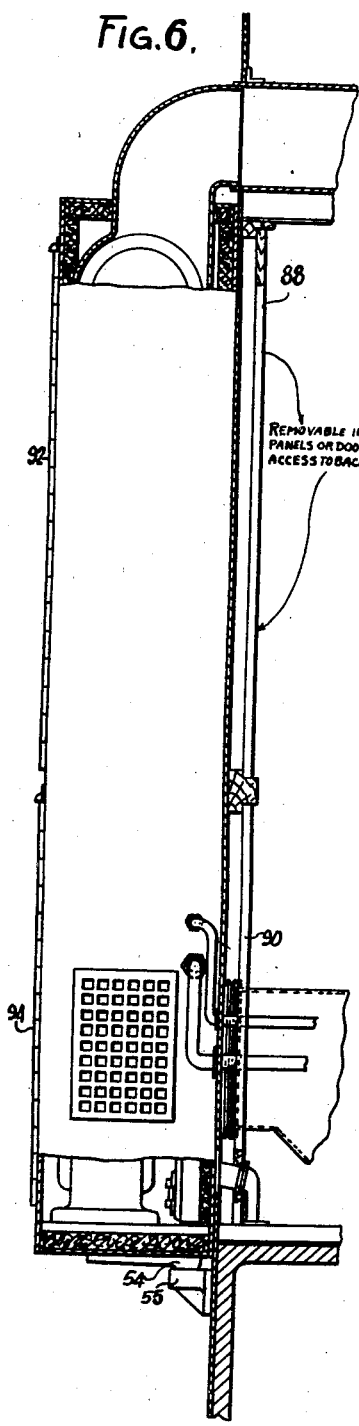
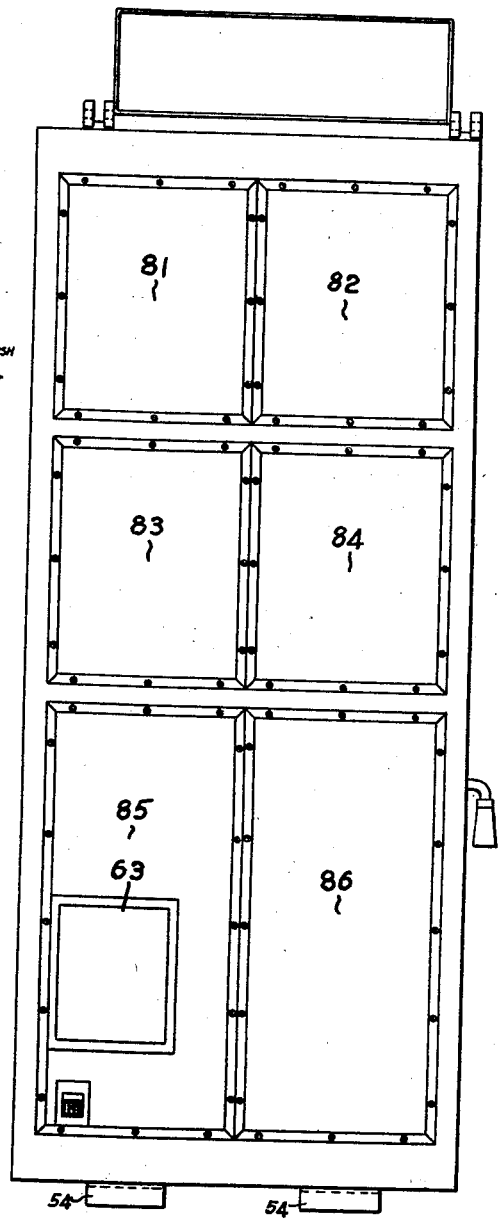

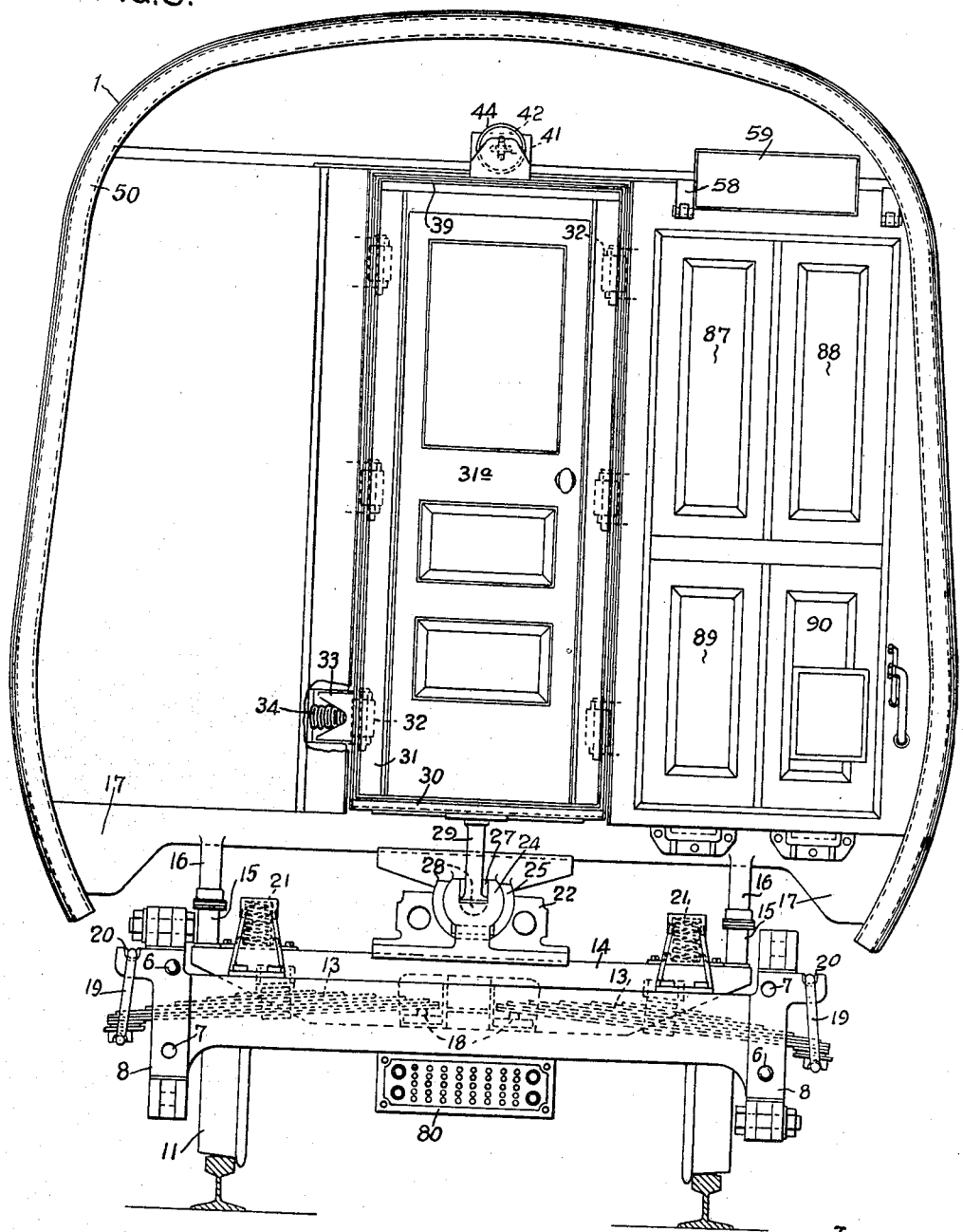

Patented June 6, 1939

2,161,686

UNITED STATES PATENT OFFICE 2,161,686

AIR CONDITIONING APPARATUS FOR RAILWAY VEHICLES

Theodore H. Schoepf and David M. Ritchie, Cincinnati, Ohio, assignors to The Cincinnati Traction Building Co., Cincinnati, Ohio, a corporation of Ohio Original application September 9, 1936, Serial No. 99,996. Divided and this application January 21, 1937, Serial No. 121,638

2 Claims. (Cl. 105—4)

Our invention relates to air conditioning apparatus for railway vehicles.

It is an object of our invention to provide an air conditioning apparatus for railway vehicles, in which there is a combination of the advantages of an articulated truck beneath the adjacent ends of adjacent car bodies, the advantages of a separable truck for the respective ends of the adjacent car bodies and the advantage of an air conditioning unit being carried on the end of each car body adjacent the end of the adjacent car body, so that the air conditioning unit can be carried in the space between the two adjacent car bodies.

It is an object of this invention to provide in this combination a detachable vestibule which is detachably supported by one car body in overlapping engagement therewith and, when this car body is assembled with the adjacent car body and the separable trucks are connected to form a single truck, then the air conditioning units supported on the respective faces of the respective ends of the respective car bodies will be enclosed in the space between the vestibules.

It is our particular object to provide a distribution system for conditioning the interior of a railway vehicle in association with the detachable air conditioning unit mounted on the end of the vehicle in space that is customarily lost space, as it is the area between the ends of the vehicle that is necessary for the relative movement of the two vehicles with respect to one another upon the common truck which supports these ends.

An important object of this invention is that the air conditioning apparatus is all located in a removable cabinet. In case of failure of this equipment the cabinet is just replaced by another cabinet unit. The work of repairing the equipment in the cabinet can be done in the shop at a saving of time and costs. The work does not have to be done on the tracks or in train sheds in all kinds of weather. The vehicle can be kept in regular service with no loss of time or laid-up equipment due to air conditioning apparatus.

This application is a division of our application, Serial No. 99,996, filed Sept. 9, 1936.

Referring to the drawings:

Figure 6 is a section on the line 6—6 of Figure 4.

Figure 7 is a rear elevation of the air conditioning cabinet.

Figure 8 is an elevation of one end of a car body with the air conditioning cabinet removed showing the panel construction permitting access from the inside of the car to the air conditioning cabinet.

Figure 1:
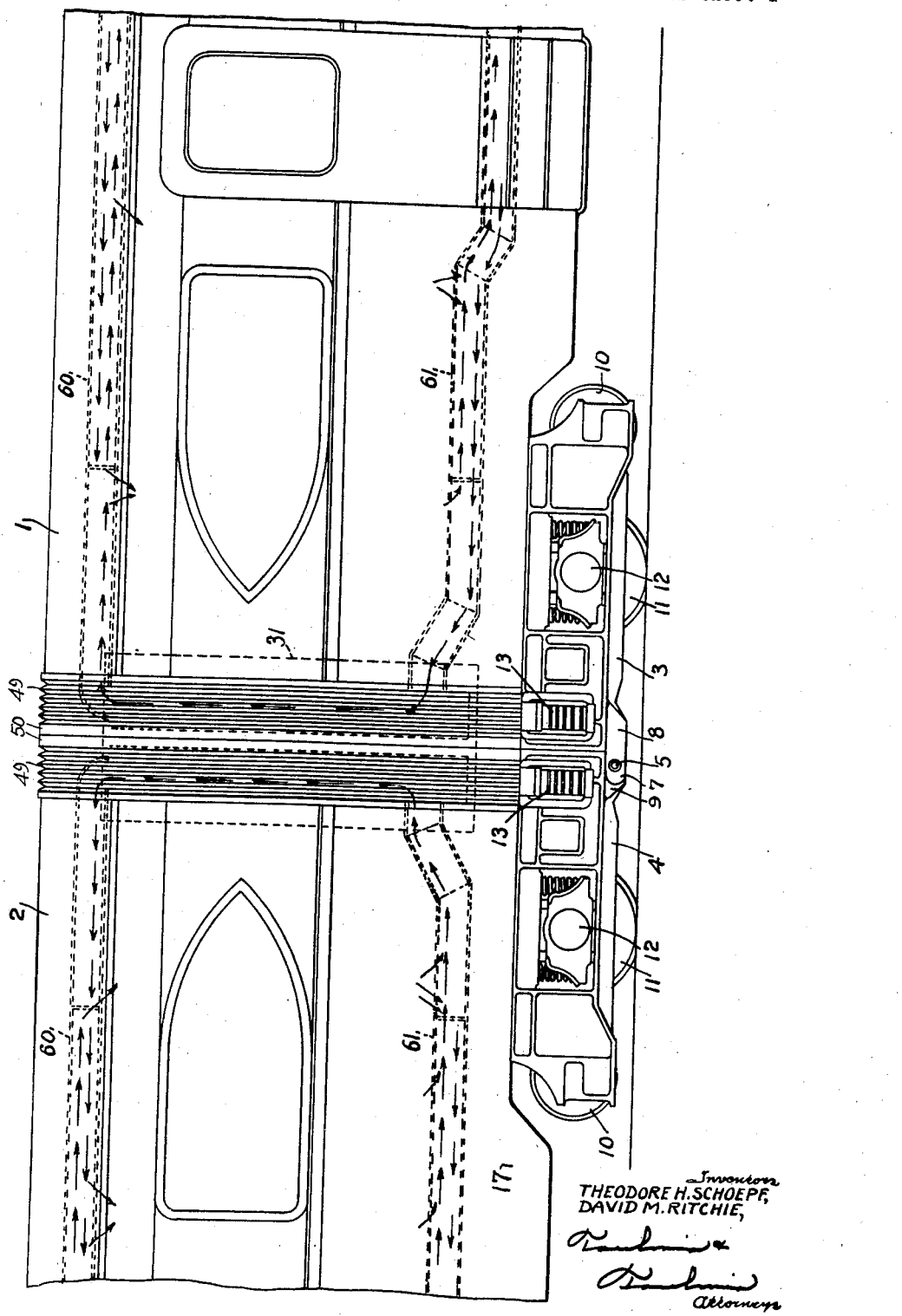
Figure 1 shows the adjacent ends of adjacent car bodies connected together and their respective trucks connected together to form a single truck to serve as a support for the articulation of the two car bodies on the common truck. The air distributed ducts and air conditioning units are shown in dotted lines.

Referring to the drawings in detail, 1 designates a car body and 2 an adjacent car body. These car bodies are mounted upon a common truck consisting of the halves, generally designated 3 and 4. These halves are joined together by the anchoring pins 5 and aligning studs 6 and sockets 7 arranged on the adjacent frame members 8 and 9. Each truck half is provided with a rear wheel 10 which can be raised and lowered at will, as is more fully set forth in the application of David M. Ritchie Serial No. 7,752 filed Feb. 23, 1935, and now Patent No. 2,111,676, dated March 22, 1938, which also describes completely this truck and the method of support of the cylindrical vestibule hereinafter described.

Figure 2:
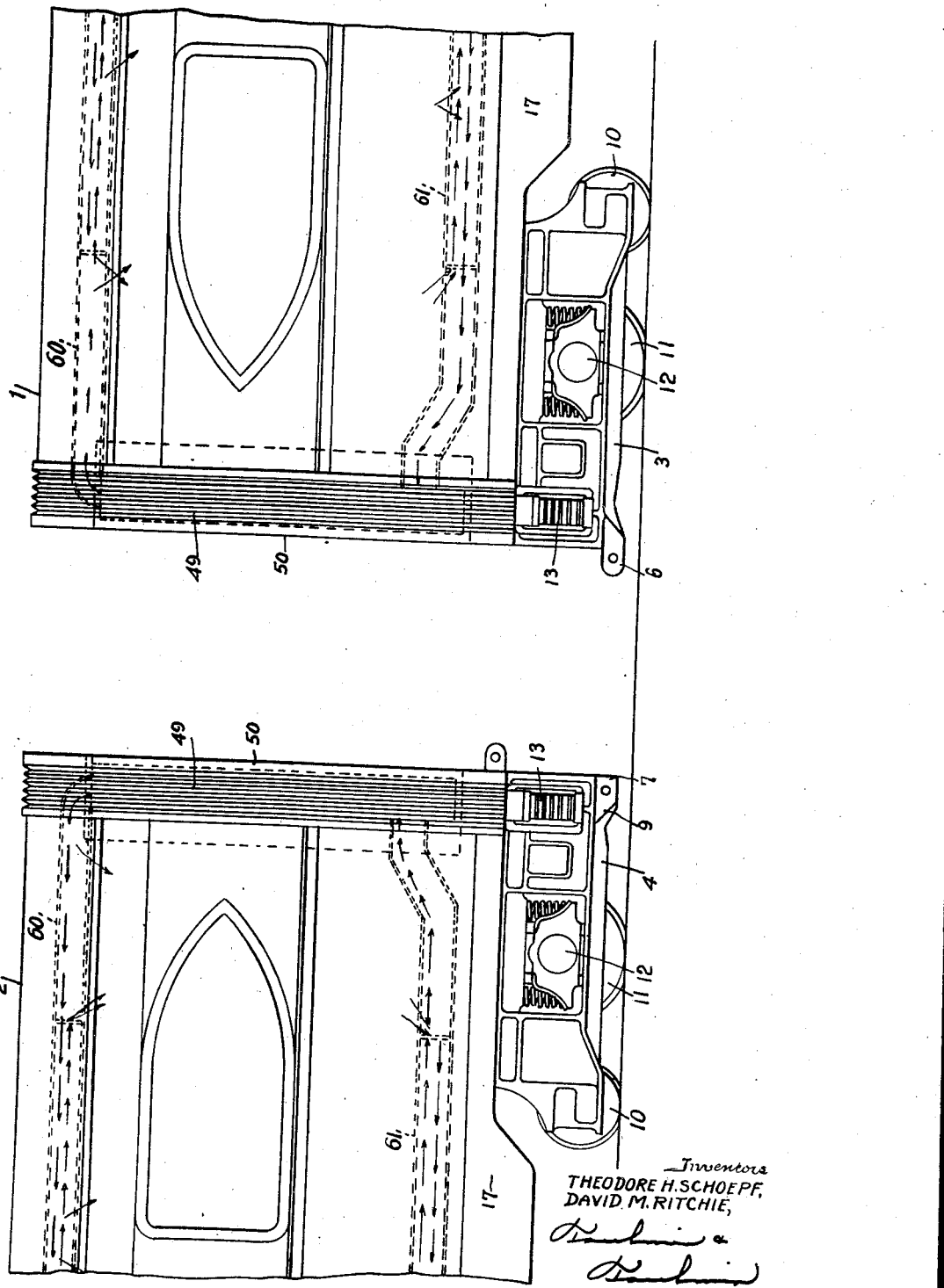
Figure 2 is a similar view with the car bodies separated, showing the independent support of the car bodies by the separable trucks and the independent support of the air conditioning units by the respective car bodies.
Figure 3:
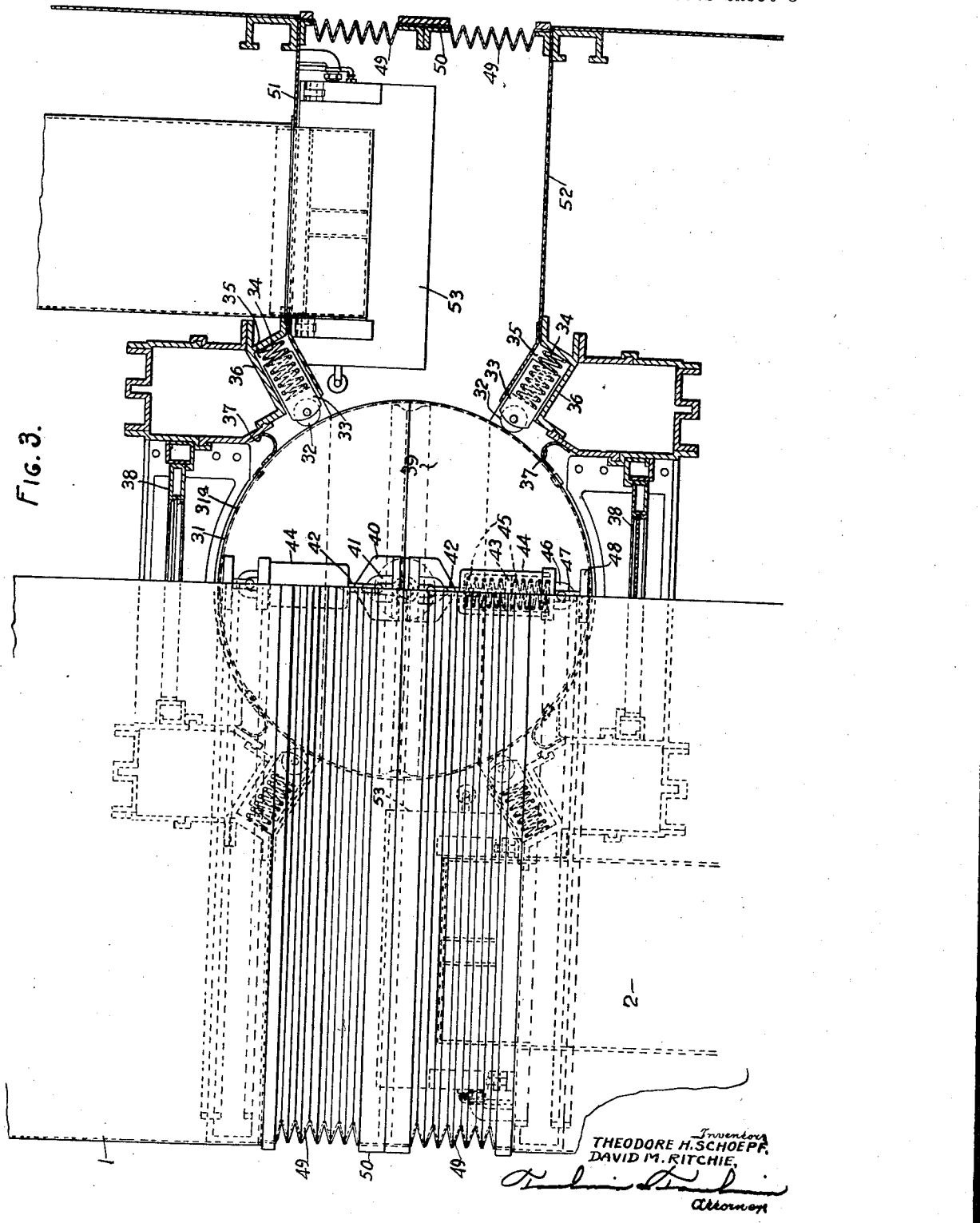
Figure 3 is a top plan view, partially in section, showing the arrangement of the accordion vestibule, the vestibule drum, the yielding supports therefor and air conditioning units.

The wheel 10 is only lowered when the halves of the truck are separated, as in Figure 2. In addition to the wheels 10 with their axle, there are the main wheels 11 having an axle 12. A pair of transverse bolster springs 13 yieldingly support the bolster 14 which carries side bearings 15 engaging the side bearings 16 on the opposite sides of the bottom of the car frame 17. The inner ends of these springs 13 rest upon pads 18 mounted upon the frame of the truck. The outer ends of these springs are supported upon swinging links 19 pivoted upon the truck frame 20. The center portions of the springs 13 support the opposite ends of the bolster 14.

This bolster carries a socket casting 22 which is equipped with a pin 6a and a socket 7a for cooperatively engaging with similar mechanism on the adjacent truck half. The casting 22 is provided with a ball 24 associated with the socket 25 that is carried on the bracket 26 on the end of the car frame 17. Within the ball 24, there is mounted within a socket 27 upon a ball 28, the supporting pin 29 for the bottom 30 of the cylindrical vestibule 31.

This vestibule is arranged in overlapping relationship to the car frame 17 and the floor that it supports. It is maintained in its substantially vertical position by a plurality of oppositely disposed spaced spring pressed rollers 32 which are carried in roller supports 33 that are impelled towards the vestibule by the springs 34 mounted within the socket or cage 35 in the end of the frame 36 constituting a part of the door structure of the car. This frame 36 of the car is engaged with a yielding, sealing strip 37 carried on the vestibule 31.

The cylindrical vestibule has cut-away door portions 31a to permit the passage of passengers therethrough from car to car. Each car is provided with a door 38 mounted in the frame 36.

The top of the vestibule is held in position by the following mechanism. There is mounted on top of the vestibule cover 39 a bracket 40 which has oppositely disposed eyes 41. These eyes are connected to piston rods 42 having pistons 43 working in the cylinders 44. There are springs 45 on either side of the piston 43. The cylinder 44 is connected by a staple 46, corresponding to a staple 47 mounted on the pad 48 which is in turn mounted upon the car body face. This vestibule is yieldingly held in its vertical position despite the swinging movements of the car bodies on the articulation and the vertical movements due to brakes in grade.

The adjacent car bodies have connected on their ends the collapsible accordion vestibules 49, the outer ends of which are connected to the arcuate frame member 50 that is supported at its bottom by the car frame members 17.

Figure 4:
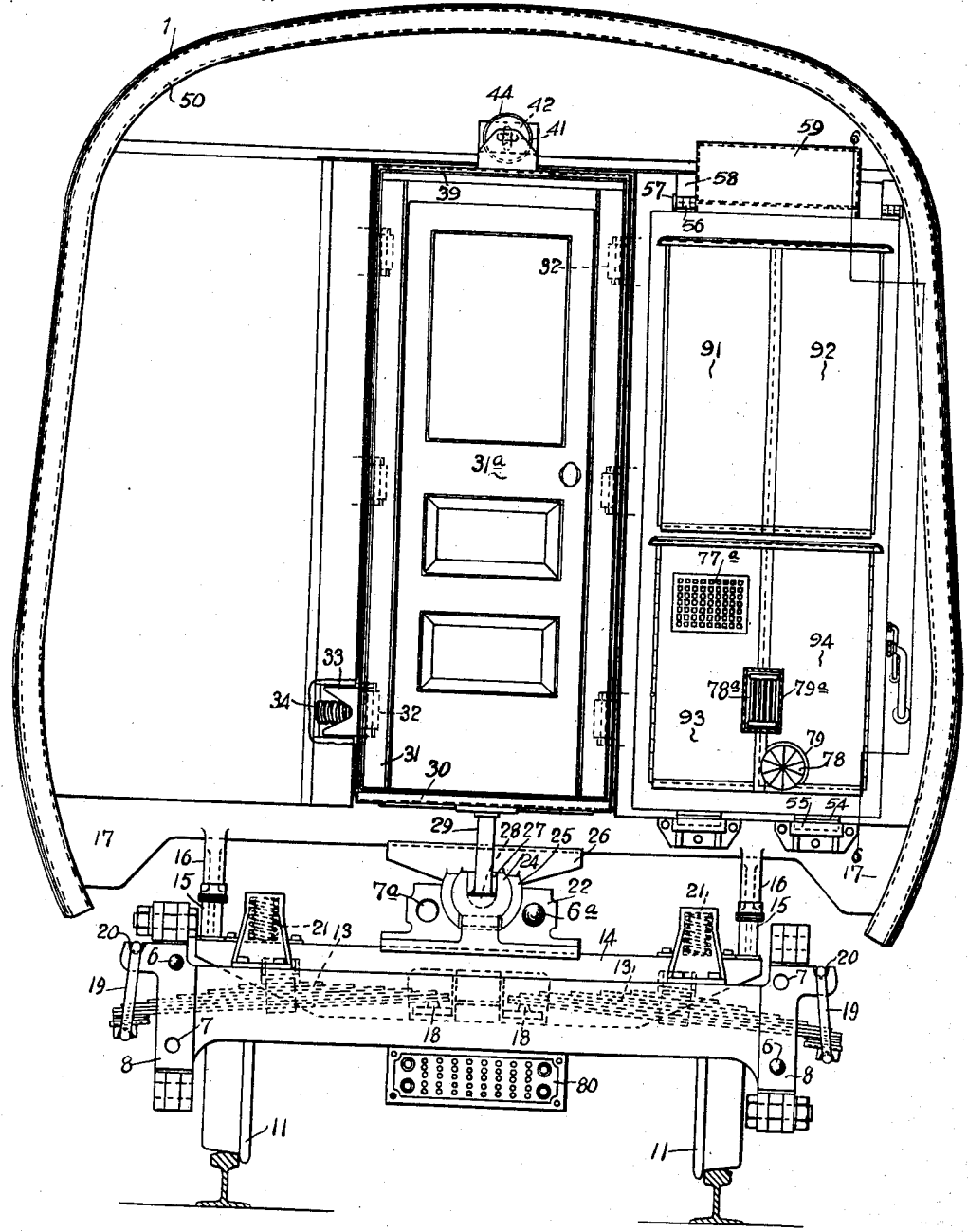
Figure 4 is an end elevation of the car body which has a truck that supports the cylindrical vestibule. This view also illustrates the support of this car body.
Figure 5:
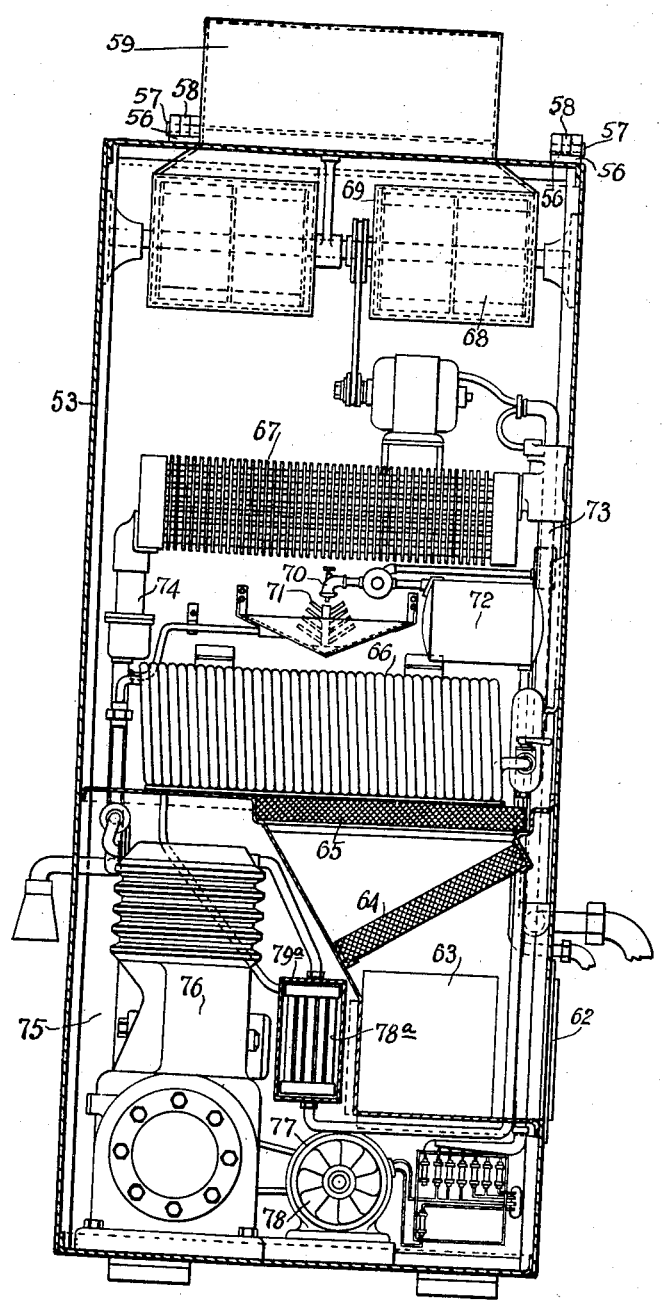
Figure 5 is a detail view of the interior of this air conditioning unit.

This leaves a space between the adjacent end walls 51 and 52 of the adjacent car bodies, the accordian vestibules 49 and the vertical side wall 31 of the vestibule drum. This space is partially occupied by the detachable air conditioning cabinets 53 which are supported (see Figure 4) by lugs 54 in socket brackets 55 bolted on the face of the end sill casting or floor frame 17 of the car body. The top of this cabinet is connected by straps 56, removable bolts 57 and ears 58 on the car body face 51 or 52. By removing the bolts 57 and lifting the cabinet 53, it is possible to completely remove the entire air conditioning apparatus for service, replacement or repair, without putting the train out of permanent commission, while the servicing or repairing is being carried out. The top of the cabinet is detachably connected to a discharge vent passageway 59 which communicates with the discharge passageway 60 in the top of the car to which the air conditioning cabinet 53 is attached.

The return air returns through the passageway 61 to the bottom of the cabinet. Fresh intake air is taken in the cabinet through the side port 62, where it is mingled with the air returning through the port 63 from the return air passageway 61. The air then passes upwardly through filters 64 and 65, over the coil 66 which is used as a cooling coil, over the heat tempering coil or radiator 67, thence upwardly through the fan 68 in the casing 69 and thence out through the discharge passageways 59 and 60. The humidifier 70 is provided for supplying moisture over the drip plates 71. This moisture is supplied from a tank 72. Steam is supplied to the steam radiator for tempering the air in cool weather through the pipes 73 and 74, acting respectively as supply and return pipes connected to the steam system of the train.

Within the cabinet 53 is a separate compressor compartment 75, in which is mounted the compressor 76, its driving motor 77 and a fan 78 which draws in air through the opening 79 in the face of the cabinet 53. This air is discharged through the exit grill 77a adjacent the top of the compressor. The condenser 78a is in open communication with the exterior of the cabinet 53 and is enclosed within its own casing 79a. It is thus in a position to be cooled in the usual manner.

In operation, the adjacent cars, when coupled together, act as any other articulated train would act. To all intents and purposes, it is a solid articulated train. The difficulty with articulated trains has been that being a complete unit of a series of car bodies, if anything happened to the apparatus of any one of the car bodies, it placed the entire train out of commission. By the present invention, it is possible to separate the bodies independently, one of the other, with independent trucks and to remove one of the bodies and replace it with another without necessitating the complete dismantling of the train. Furthermore, by placing the air conditioning cabinets, as indicated, two cabinets for each car body, one on each end, it is possible to merely separate the trucks and the car bodies, lift out the air conditioning cabinet which is detached in the simple manner described, replace it with a new one, again connect the bodies and trucks, and the train can continue, while the air conditioning equipment can be serviced or repaired in a shop where that work can be much more conveniently done than attempt to perform the same service upon the air conditioning equipment while on the train.

We have provided the usual jump-over connections, as indicated, on the jump-over engaging plate 80.

The air conditioning cabinet is optionally provided with a series of removable back panels 81, 82, 83, 84, 85 and 86. These panels are directly behind corresponding panels in the end of the car body as at 87, 88, 89 and 90. Thus, if individual pieces of equipment are to be adjusted or removed, the opening of the panels 87 to 90 inside of the car will enable access to the panels 81 to 86 in the back of the cabinet. This can be done without going between the car bodies or removing the cabinet from its position on the car body.

The front of the cabinet is provided with access doors 91, 92, 93 and 94.

It will be understood that we desire to comprehend within our invention such modifications as come within the scope of the claims and the invention.

Having thus fully described our invention, what we claim as new and desire to secure by Letters Patent is:

1. In an articulated railway train, the combination of adjacent cars, a common truck, means for articulating said cars with respect to said truck, an enclosure for the space between said cars, mounted on the side walls of the cars, a vestibule located between said car bodies, and an air conditioning unit operatively connected with a distribution system in the car body to which it is attached mounted on the outside end of the car body between said vestibule and said enclosure enclosing the articulation.

2. In an articulated railway train, the combination of adjacent cars, a common truck, means for articulating said cars with respect to said truck, an enclosure for the space between said cars mounted on the side walls of the cars, a vestibule located between said car bodies, and an air conditioning unit operatively connected with a distribution system in the car body to which it is attached mounted on the outside end of the car body between said vestibule and said enclosure enclosing the articulation, said air conditioning cabinet being vertically disposed on the end of said car body and of such horizontal dimension as to permit said bodies to approach one another on the articulation without the air conditioning unit engaging the opposite wall of the opposite car body.

THEODORE H. SCHOEPF.
DAVID M. RITCHIE.